US011367062B2

(12) United States Patent
Carlyle et al.

(10) Patent No.: US 11,367,062 B2
(45) Date of Patent: Jun. 21, 2022

(54) USING LOW ENERGY BEACONS TO ENABLE A STREAMLINED CHECKOUT PROCESS

(71) Applicant: JPMorgan Chase Bank, N.A., New York, NY (US)

(72) Inventors: Jason Carlyle, Chicago, IL (US); Tu P. Le, Chicago, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 202 days.

(21) Appl. No.: 16/405,045

(22) Filed: May 7, 2019

(65) Prior Publication Data

US 2019/0340597 A1 Nov. 7, 2019

Related U.S. Application Data

(60) Provisional application No. 62/667,920, filed on May 7, 2018.

(51) Int. Cl.
*G06Q 40/00* (2012.01)
*G06Q 20/32* (2012.01)
*H04W 4/80* (2018.01)
*G06Q 20/40* (2012.01)
*G06Q 20/20* (2012.01)

(52) U.S. Cl.
CPC ........... *G06Q 20/327* (2013.01); *G06Q 20/20* (2013.01); *G06Q 20/4016* (2013.01); *H04W 4/80* (2018.02)

(58) Field of Classification Search
None
See application file for complete search history.

(56) References Cited

U.S. PATENT DOCUMENTS

| 2007/0203850 | A1* | 8/2007 | Singh | G06Q 20/327 |
| | | | | 705/67 |
| 2012/0023567 | A1* | 1/2012 | Hammad | G06Q 20/4016 |
| | | | | 726/9 |
| 2013/0197998 | A1* | 8/2013 | Buhrmann | G06Q 20/4016 |
| | | | | 705/14.53 |
| 2014/0114780 | A1 | 4/2014 | Menefee et al. | |
| 2014/0188708 | A1 | 7/2014 | Govindarajan et al. | |
| 2015/0339696 | A1* | 11/2015 | Zhou | G06Q 20/387 |
| | | | | 705/14.23 |
| 2016/0183854 | A1* | 6/2016 | Lee | A61B 5/14514 |
| | | | | 600/347 |

(Continued)

OTHER PUBLICATIONS

Official Communication (International Search Report) issued in W.I.P.O. Patent Application No. PCT/US2019/031054, dated Jul. 18, 2019.

(Continued)

*Primary Examiner* — Chia-Yi Liu
(74) *Attorney, Agent, or Firm* — Greenblum & Bernstein, P.L.C.

(57) ABSTRACT

A system for and method of utilizing the low energy transmitter of a user device to communicate with a point-of-sale terminal in order to permit a consumer to conduct a purchase or other transaction with little or no interaction with the user device are disclosed. The system and method may also permit a purchase card processor to request additional levels of validation or authorization from the consumer in cases where the risk level of a transaction is high.

5 Claims, 2 Drawing Sheets

(56) References Cited

U.S. PATENT DOCUMENTS

2016/0189132 A1* 6/2016 Cash ............... G06Q 30/0259
  705/14.57
2017/0300880 A1* 10/2017 Gilbey .............. G06Q 20/325
2018/0096329 A1   4/2018 Hamilton et al.

OTHER PUBLICATIONS

Official Communication (Opinion) issued in W.I.P.O. Patent Application No. PCT/US2019/031054, dated Jul. 18, 2019.

* cited by examiner

USING LOW ENERGY BEACONS TO ENABLE A STREAMLINED CHECKOUT PROCESS

TECHNICAL FIELD

The present disclosure relates generally to systems and methods for an improved checkout process using a low energy beacon signal to authorize transactions at the point of sale without the need to manipulate a user device.

BACKGROUND

The checkout process associated with making in-person purchases is something that consumers may perform multiple times per week. The checkout process has improved over time as the result of improved technology. For example, the proliferation of purchase cards such as debit and credit cards allowed for the reduction and even elimination of the need to handle cash and make change at a point of sale. The credit card process itself has improved, from an early requirement to make an imprint of the raised account numbers, to magnetic encoding, to embedded microchips, etc., each of which make a transaction quicker and more secure for the consumer. There are existing methods of payment that utilize proximity-based payment methods (such as Radio-Frequency Identification (RFID) and Near-Field Communication (NFC)) however, these technologies require physically placing a payment article or user device in close proximity to or even in contact with a merchant's sale terminal. While this may be faster than using a purchase card in most cases, it still requires a consumer take their user device out of their pocket or purse and manipulate it. This can be cumbersome and risks damage or loss of the user device.

Therefore, it is appreciated that a need exists for systems and methods for an improved checkout process enabling a user to complete a transaction without the use of a purchase card, cash, or need to manipulate a user device.

SUMMARY

In an exemplary embodiment, a method for an improved checkout process is provided. The method comprising: registering a user device with a merchant, wherein registration comprises at least associating the user device with a low energy beacon signal and authorizing payment of transactions according to one or more transaction parameters; receiving a transaction request at a point of sale (POS) device associated with the merchant, wherein the transaction is between a user associated with the user device and the merchant; recognizing the user device at the POS device according to the low energy beacon signal associated with the user device; and automatically processing payment of the transaction according to the one or more transaction parameters.

In another exemplary embodiment, a system for an improved checkout process is provided. The system comprising: a beacon processing server configured to register a user device with a merchant, wherein registration comprises at least associating a user device with a low energy beacon signal and authorizing payment of transactions according to one or more transaction parameters; a point of sale (POS) device configured to: initiate a transaction at a POS associated with the merchant, wherein the transaction is between a user associated with the user device and the merchant; recognize the user device at the POS according to the low energy beacon signal associated with the user device; and, accept automatic payment for the transaction according to the one or more transaction parameters.

In yet another exemplary embodiment, a method for an improved checkout process is provided. The method comprising: registering a user device with a merchant, wherein registration comprises at least associating the user device with a merchant low energy beacon signal and authorizing payment of transactions according to one or more transaction parameters; receiving a transaction request at a point of sale (POS) associated with the merchant, wherein the transaction is between a user associated with the user device and the merchant; recognizing the POS at the user device according to the merchant low energy beacon signal associated with the user device; and, automatically processing payment of the transaction according to the one or more transaction parameters.

These and other objects, features, and advantages of the present disclosure will become apparent from the following detailed description of illustrative embodiments thereof, which is to be read in connection with the accompanying drawings.

BRIEF DESCRIPTION OF THE DRAWINGS

These and other features of the present disclosure will become better understood with regard to the following description and accompanying drawings in which.

DETAILED DESCRIPTION

Aspects and implementations of the present disclosure will be understood more fully from the detailed description given below and from the accompanying drawings of the various aspects and implementations of the disclosure. This should not be taken to limit the disclosure to the specific aspects or implementations, but explanation and understanding only.

Figure 1:
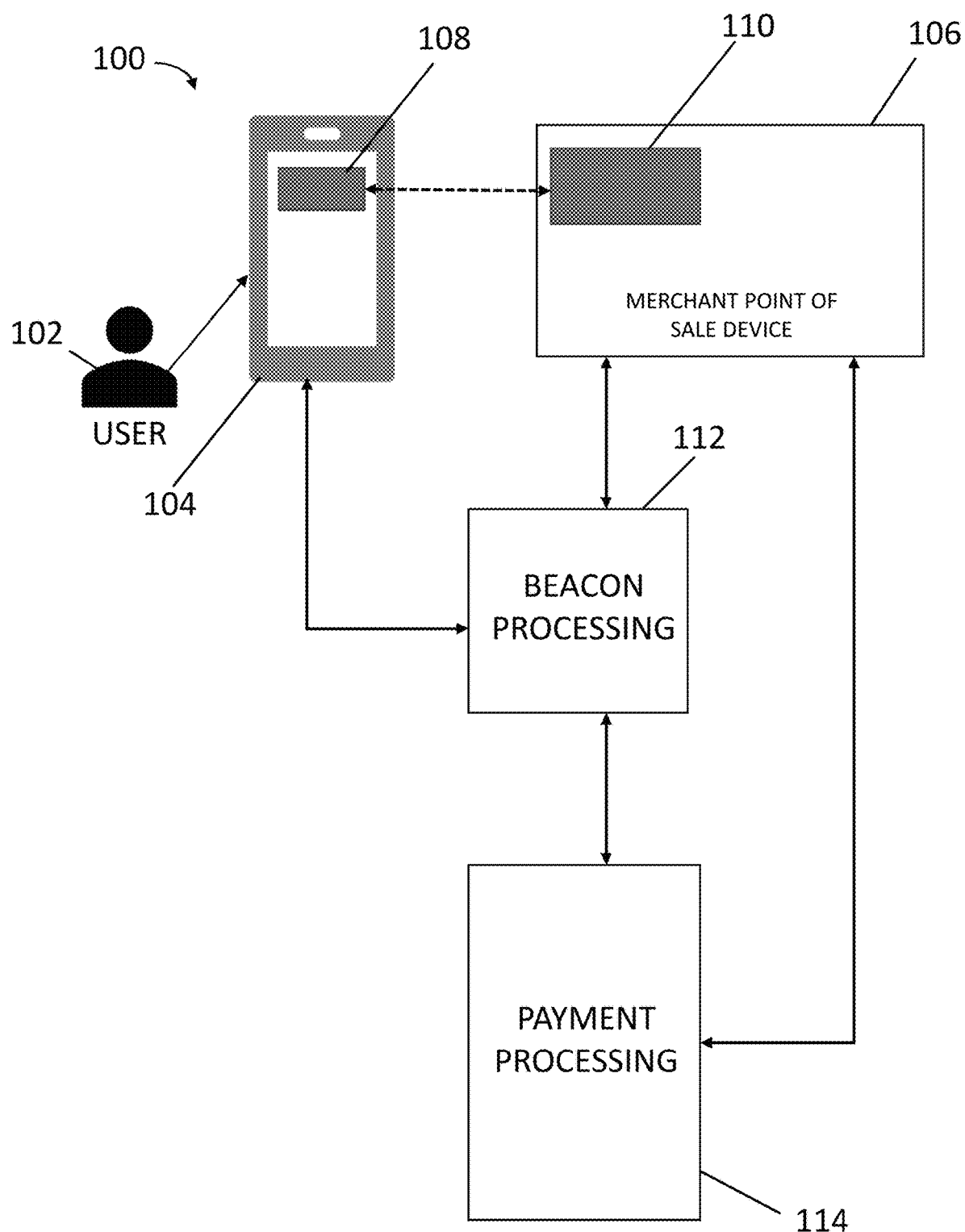
FIG. 1 illustrates an exemplary process flow according to an exemplary system for an improved checkout process.

As is illustrated in FIG. 1, a system 100 for performing an improved checkout process comprises at least a user 102 associated with a user device 104, a point of sale (POS) device 106, a beacon processing server 112, and a payment processing server 114. The components of system 100 may communicate over a network, for example, an intranet network or the Internet. User device 104 may comprise a low energy transmitter and receiver device 108. POS device 106 may comprise a low energy transmitter and receiver device 110. User device 104 may be any mobile computing device, such as, but not limited to, a mobile phone, laptop computer, smart watch, tablet, etc., configured to transmit and receive signals to compatible devices. It will be appreciated that user device 104 may be embodied in various combinations of hardware and software components comprising at least a low energy transmitter and receiver device 108 configured to wirelessly communicate (e.g. transmit and/or receive signals) when in physical proximity to a compatible device, for example, low energy transmitter and receiver device 110. POS device 106 may be any device suitable to accept payment information related to a transaction. In some embodiments, POS device 106 is a computer, e.g. a laptop or desktop computer, tablet computer, or the like. In certain embodiments, POS device 106 may comprise one or more input or display devices to facilitate completion of a transaction, for example, a scanner for scanning item barcodes, a display for showing transaction details, a keyboard for manual entry of transaction details, a credit card reader, etc. It will be appreciated that in certain embodiments, POS device 106, low energy transmitter and receiver device 110, beacon processing server 112, and/or payment processing server 114 may be embodied in one or more devices.

User device 104 and POS device 106 are operable to establish electronic communication with one another via low energy transmitter and receiver devices 108 and 110, respectively. In some embodiments, low energy transmitter and receiver device 108 and/or low energy transmitter and receiver device 110 may be Bluetooth® Low Energy (BLE) compatible devices operable to function as BLE beacons. A BLE beacon is a class of BLE device that is operable to broadcast a signal or identifier which may trigger a response when recognized by a compatible device. BLE beacons have a range much greater than other proximity-based communication technologies (for example, RFID and NFC), which can streamline a transaction where a user does not have to place a user device in close proximity to a reader in order to establish a communication. In some embodiments, user device 104 and associated low energy transmitter and receiver device 108 may function as a BLE beacon which may trigger a response at POS device 106. In other embodiments, POS device 106 and associated low energy transmitter and receiver device 110 may function as a BLE beacon and trigger a response at user device 104. In certain embodiments, low energy transmitter and receiver device 108 and/or low energy transmitter and receiver device 110 may be integrated within a device, and in other embodiments, low energy transmitter and receiver device 108 and/or low energy transmitter and receiver device 110 may be a standalone device associated with user device 104 or POS device 106. For example, a standalone low energy transmitter and receiver device may comprise a dongle (or the like) configured to act as a beacon and transmit a low energy single that may be recognized by user device 104 and/or POS device 106. A standalone low energy transmitter and receiver device and associated signals may be associated with a device via an application or registration process substantially similar to the application or registration process with respect to user device 104.

To conduct in-person transactions between a customer (e.g. user 102) and a merchant, a merchant may use POS device 106 (also referred to herein as a point of sale (POS) terminal) to receive credit card information from the customer. It will be appreciated that, as used herein, the term credit card may comprise various types of purchase cards accepted by a merchant for payment purposes, including, but not limited to, credit cards, charge cards, debit cards, gift cards, etc. POS device 106 may be configured to communicate with a payment processing server 114 to process a customer's credit card information. Payment processing server 114 may comprise a credit card processing service operable to process a sales transaction, for example, charging funds against a user's credit account and distributing funds to a merchant account. Various other processing activities may be performed at payment processing server 114 consistent with payment processing technology as recognized in the art.

In certain embodiments, user 102 may register a user device 104 and an associated low energy transmitter and receiver device 108 with beacon processing server 112. The registration may be performed using user device 104 or a similar computing device. In some embodiments, registration may be performed using a website, online portal, or the like. In certain embodiments, registration may require that user 102 install an application on the user device 104 in order to associate the signals generated by the low energy transmitter and receiver device 108 with the user 102 and user device 104. In certain embodiments, an application installed on user device 104 may facilitate transmission and/or receiving of signals from low energy transmitter and receiver device 108 to other compatible devices, for example, low energy transmitter and receiver device 110.

Registration may require the user 102 to pre-authorize certain transactions according to one or more transaction parameters. For example, transaction parameters may pre-authorize transactions with a particular merchant, transactions within a certain geographic region, transactions limited to a certain monetary amount, number of transactions within a specific time period, etc. Transaction parameters may be linked and/or combined to create one or more transaction profiles (e.g. work, personal, etc.) that may be selected by user 102. Registration may further require user 102 to provide payment account information, such as, but not limited to, name, address, account number, etc. User 102 may associate one or more payment accounts with different transaction parameters. In certain embodiments, user 102 may designate one or more authorized users to complete purchases using the user device 104. In some embodiments, only one authorized user may be used for each registration. For example, a rewards card that user 102 typically only uses for gas may be associated with transaction parameters that limit purchases to gas stations and transactions under $50. In certain embodiments, user 102 may register a digital wallet associated with user device 104 to conduct purchases using the low energy transmitter and receiver device 108. In some embodiments, registration requires user 102 to submit additional identification information, such as, but not limited to, license number, date of birth, eye color, ID picture, etc. In some embodiments, registration information is stored at beacon processing server 112. In other embodiments registration information may be stored at payment processing server 114. It will be appreciated that in certain embodiments, registration information relating to user 102 may be stored externally to beacon processing server 112 and/or processing server 114.

Figure 2:
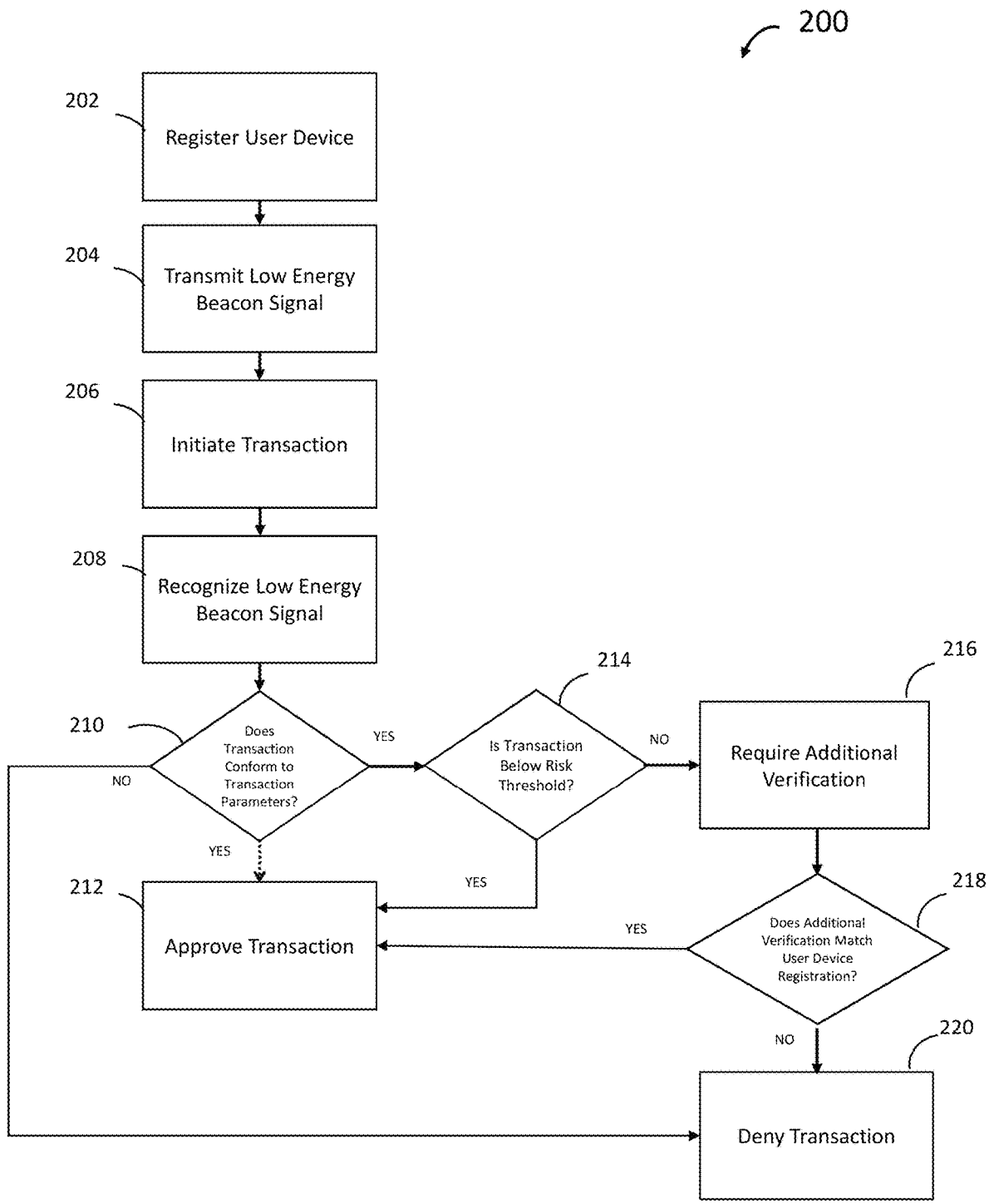
FIG. 2 is a flow chart illustrating steps taken according to an exemplary method for an improved checkout process.

After a user device 104 and associated low energy transmitter and receiver device 108 are registered, a user 102 may begin to conduct purchases. As shown in FIG. 2, an exemplary method 200 for an improved checkout process may be used in connection with such a purchase. It will be appreciated that the illustrated method 200 and associated steps may be performed in a different order, with illustrated steps omitted, with additional steps added, or with a combination of reordered, combined, omitted, or additional steps. At step 202, a user device is registered. As previously discussed, registration may be accomplished using user device 104 or similar electronic device to register transaction parameters and/or additional purchase and identification information with beacon processing server 112. Registration also may associate the registration information with user 102, user device 104, and low energy transmitter and receiver device 108. Once registered, the low energy transmitter and receiver device 108 of user device 104 may transmit a low energy beacon signal at step 204. This signal can be a signal ordinarily transmitted by the low energy transmitter portion of the low energy transmitter and receiver device 108 or it can be a signal that is caused to be transmitted by an application program operating on the user device 104.

At step 206, the POS device 206 may initiate a transaction. A transaction may be initiated by scanning an item to be purchased via a scanner at POS device 206. Once the transaction is initiated, POS device 206 and associated low energy transmitter and receiver device 110 may begin identification and detection of a compatible low energy beacon signal. POS device 106 may detect the presence signal generated by low energy transmitter and receiver device 108 at step 208. Once a connection is established between the user device 104 and the POS device 106, the POS device may communicate with the beacon processing server 112 to access information relating to user 102, for example, one or more transaction parameters associated with user 102. At step 210, it is determined if the transaction conforms to the one or more transaction parameters associated with user 102. If it is determined at step 210 that the transaction does not conform to the one or more transaction parameters, the transaction is denied at POS device 106 at step 220. In some embodiments the determination at step 210 is performed at beacon processing server 112, and in other embodiments the determination is performed at payment processing server 114. If the transaction does conform to the one or more transaction parameters, the method 200 moves to step 214 where it is determined if the transaction is below a risk threshold. The risk threshold may comprise various factors associated with the risk of a given transaction. For example, transactions over a certain dollar amount, transactions involving certain items, etc. The risk threshold may be pre-determined by a merchant associated with POS device 106 or the payment provider associated with payment processing server 114. In some embodiments, the method 200 may proceed directly to step 212 to approve the transaction so long as it is determined at step 210 that the transaction conforms to the one or more transaction parameters. If it is determined at step 214 that the transaction is below the risk threshold, the transaction will be approved at step 212. As previously discussed, POS device 106 may process a transaction via payment processing server 114.

If it is determined at step 214, that the transaction is above a certain risk threshold, additional verification may be required at step 216. Additional verification may include, but is not limited to, verifying additional identifying information supplied by the user 102 during the registration process. In some embodiments, an ID picture of user 102 is displayed at POS device 106 in order for the merchant to make a visual confirmation that the user 102 is the one attempting to conduct the transaction. A merchant user at POS device 106 may deny an automatic transaction or require additional verification via the POS device 106 at any time. In some embodiments, the additional verification may require the user 102 to enter a personal identification number (PIN) into the POS terminal 106, provide additional identifying information, and/or sign a receipt or signature pad. In some embodiments, additional verification may comprise sending a notification to the user device 104 asking the user 102 to perform an additional authentication, such as a passcode, Face ID, or the like. It is appreciated that in certain embodiments, additional authentication may comprise additional 2-factor authentication procedures. At step 218, it is determined if the additional verification matches the information associated with a user 102's registration. If the information matches, the transaction is approved at step 212. If the additional verification does not match, the transaction is denied at step 220.

In some embodiments, after a transaction is approved at step 212, POS device 106 may transmit an invoice from the merchant to the user 102 for authorization. An invoice may comprise one or more transactions, allowing the user 102 to pay for transaction conducted using method 200 as invoices are issued, or according to their due date. In some embodiments, invoices may be issued by beacon processing server 112. In certain exemplary embodiments, an application program on the user device 104 may record the transaction information or location of a POS terminal 106 which the user 102 visited and enable the user 102 to rate their satisfaction or experience with the transaction or location. In other exemplary embodiments, an invoice or other information related to a transaction may be stored on a blockchain and made available to the public. A consumer could then identify a particular transaction and encrypt it so as to make the details unavailable to the public. Thus, a merchant would not have to transmit invoices to a plurality of consumers 102.

The term "module" or "engine" used herein will be appreciated as comprising various configurations of computer hardware and/or software implemented to perform operations. In some embodiments, modules or engines as described may be represented as instructions operable to be executed by a processor and a memory. In other embodiments, modules or engines as described may be represented as instructions read or executed from a computer readable media. A module or engine may be generated according to application specific parameters or user settings. It will be appreciated by those of skill in the art that such configurations of hardware and software may vary, but remain operable in substantially similar ways.

It is to be understood that the detailed description is intended to be illustrative, and not limiting to the embodiments described. Other embodiments will be apparent to those of skill in the art upon reading and understanding the above description. Moreover, in some instances, elements described with one embodiment may be readily adapted for use with other embodiments. Therefore, the methods and systems described herein are not limited to the specific details, the representative embodiments, or the illustrative examples shown and described. Accordingly, departures may be made from such details without departing from the spirit or scope of the general aspects of the present disclosure.

What is claimed is:

1. A method for an improved checkout process, the method comprising:

providing a user device associated with a user, the user device including a first standalone Bluetooth Low Energy (BLE) device operable to function as a first BLE beacon;

providing a point of sale (POS) device associated with a merchant, the POS device including a second standalone BLE device operable to function as a second BLE beacon;

installing an application on the user device;

registering, by utilizing the application, the user device, the first standalone BLE device, and eye color and face identification information of the user with a beacon processing server, wherein registration comprises at least associating the user device with a beacon signal and authorizing payment of transactions according to one or more transaction parameters;

receiving a transaction request at the POS device associated with the merchant, wherein the transaction is between the user and the merchant;

establishing an electronic communication, in response to receiving the transaction request, between the user device and the POS device via the first standalone BLE device and the second standalone BLE device, wherein the first BLE beacon is configured to trigger a response at the POS device and the second BLE beacon is configured to trigger a response at the user device, and wherein each of the first BLE beacon and the second BLE beacon having a range greater than a range provided by a radio-frequency identification (RFID) device or a near-filed communication (NFC) device in order to streamline the transaction where the user does not have to place the user device in close proximity to the POS in order to establish the electronic communication and where the user can complete the transaction without use of a purchase card, cash, or need to manipulate the user device;

recognizing, in response to establishing the electronic communication, the user device at the POS device according to the beacon signal associated with the user device to trigger the response at the POS device; and determining a risk level associated with the transaction based on analyzing the one or more transaction parameters accessed from the beacon processing server, wherein when it is determined that the risk level associated with the transaction is below a predetermined threshold, automatically processing payment of the transaction based on recognizing the user device at the POS device in response to receiving the beacon signal in accordance with triggering the response, and wherein when it is determined that the risk level associated with transaction is above the predetermined threshold, automatically processing payment of the transaction based on recognizing the user device at the POS device in response to receiving the beacon signal in accordance with triggering the response and based on a positive verification of the eye color and face identification information of the user by accessing the beacon processing server, or automatically denying payment of the transaction based on recognizing the user device at the POS device in response to receiving the beacon signal in accordance with triggering the response and based on a negative verification of the eye color and face identification information of the user by accessing the beacon processing server.

2. The method according to claim 1, wherein registering the user device with the merchant further comprises associating visually identifying information with an authorized user of the user device.

3. The method according to claim 2, further comprising: displaying the visually identifying information associated with the authorized user at the POS device.

4. A system for an improved checkout process, the system comprising:

a user device associated with a user, the user device including a first standalone Bluetooth Low Energy (BLE) device operable to function as a first BLE beacon, wherein an application is installed on the user device;

a beacon processing server configured to register, by utilizing the application, the user device, the first standalone BLE device, and eye color and face identification information of the user with a beacon processing server, wherein registration comprises at least associating the user device with a beacon signal and authorizing payment of transactions according to one or more transaction parameters;

a point of sale (POS) device associated with a merchant, the POS device including a second standalone BLE device operable to function as a second BLE beacon, wherein the POS device is configured to receive a transaction request, wherein the transaction is between the user and the merchant; and a communication network configured to establish an electronic communication, in response to receiving the transaction request, between the user device and the POS device via the first standalone BLE device and the second standalone BLE device, wherein the first BLE beacon is configured to trigger a response at the POS device and the second BLE beacon is configured to trigger a response at the user device, and wherein each of the first BLE beacon and the second BLE beacon having a range greater than a range provided by a radio-frequency identification (RFID) device or a near-filed communication (NFC) device in order to streamline the transaction where the user does not have to place the user device in close proximity to the POS in order to establish the electronic communication and where the user can complete the transaction without use of a purchase card, cash, or need to manipulate the user device, wherein the POS device is configured to:

recognize, in response to establishing the electronic communication, the user device at the POS according to the beacon signal associated with the user device to trigger the response at the POS device; and determine a risk level associated with the transaction based on analyzing the one or more transaction parameters accessed from the beacon processing server, wherein when it is determined that the risk level associated with the transaction is below a predetermined threshold, the POS device is further configured to:

automatically process payment of the transaction based on recognizing the user device at the POS device in response to receiving the beacon signal in accordance with triggering the response, and wherein when it is determined that the risk level associated with transaction is above the predetermined threshold, the POS device is further configured to:

automatically process payment of the transaction based on recognizing the user device at the POS device in response to receiving the beacon signal in accordance with triggering the response and based on a positive verification of the eye color and face identification information of the user by accessing the beacon processing server, or automatically deny payment of the transaction based on recognizing the user device at the POS device in response to receiving the beacon signal in accordance with triggering the response and based on a negative verification of the eye color and face identification information of the user by accessing the beacon processing server.

5. The system according to claim 4, wherein the POS device is further configured to display visually identifying information associated with the user device.

* * * * *